(12) United States Patent
Doyen et al.

(10) Patent No.: US 9,332,340 B2
(45) Date of Patent: May 3, 2016

(54) DEVICE FOR CONTROLLING AND CLEANING WIRED AUDIO HEADSETS

(71) Applicant: ASSOCIATION DES PARALYSES DE FRANCE APF, Amiens Cedex 2 (FR)

(72) Inventors: Philippe Doyen, Bray-sur-somme (FR); Charles Lestoquoy, Bray-sur-somme (FR); Patrick Deseyne, Amiens cedex (FR); Sebastien Grare, Amiens cedex (FR)

(73) Assignee: ASSOCIATION DES PARALYSES DE FRANCE APF, Amiens (FR)

( * ) Notice: Subject to any disclaimer, the term of this patent is extended or adjusted under 35 U.S.C. 154(b) by 116 days.

(21) Appl. No.: 14/348,769

(22) PCT Filed: Oct. 4, 2012

(86) PCT No.: PCT/FR2012/052248
§ 371 (c)(1),
(2) Date: Mar. 31, 2014

(87) PCT Pub. No.: WO2013/050790
PCT Pub. Date: Apr. 11, 2013

(65) Prior Publication Data
US 2014/0254822 A1    Sep. 11, 2014

(30) Foreign Application Priority Data

Oct. 4, 2011   (FR) ...................................... 11 03011

(51) Int. Cl.
*H04R 29/00*    (2006.01)
*H04R 1/10*     (2006.01)
*B65G 17/12*    (2006.01)

(52) U.S. Cl.
CPC .............. *H04R 1/1091* (2013.01); *H04R 1/105* (2013.01); *H04R 1/1033* (2013.01); *H04R 29/001* (2013.01); *B65G 17/12* (2013.01)

(58) Field of Classification Search
None
See application file for complete search history.

(56) References Cited

U.S. PATENT DOCUMENTS

| | | | | |
|---|---|---|---|---|
| 4,788,708 A * | 11/1988 | Hendrix | ............... | H04R 29/001 379/22.02 |
| 8,401,200 B2 * | 3/2013 | Tiscareno | ............ | H04R 1/1016 381/58 |
| 2015/0003649 A1 * | 1/2015 | Horbach | ................ | H04R 29/00 381/309 |

FOREIGN PATENT DOCUMENTS

| | | |
|---|---|---|
| EP | 1 465 320 A2 | 10/2004 |
| GB | 2 279 760 A | 1/1995 |
| JP | 9 207986 A | 8/1997 |

OTHER PUBLICATIONS

International Search Report, dated Nov. 27, 2013, from corresponding PCT application.

* cited by examiner

*Primary Examiner* — Thang Tran
(74) *Attorney, Agent, or Firm* — Young & Thompson

(57) ABSTRACT

A device for controlling and cleaning wired audio headsets, each audio headset including a headband, two earphones and an electrical cable connected to the earphones and ending in a plug, the device includes: impedance control elements; audio control elements; elements for cleaning the headsets; elements for winding up the cable of the headset.

16 Claims, 10 Drawing Sheets

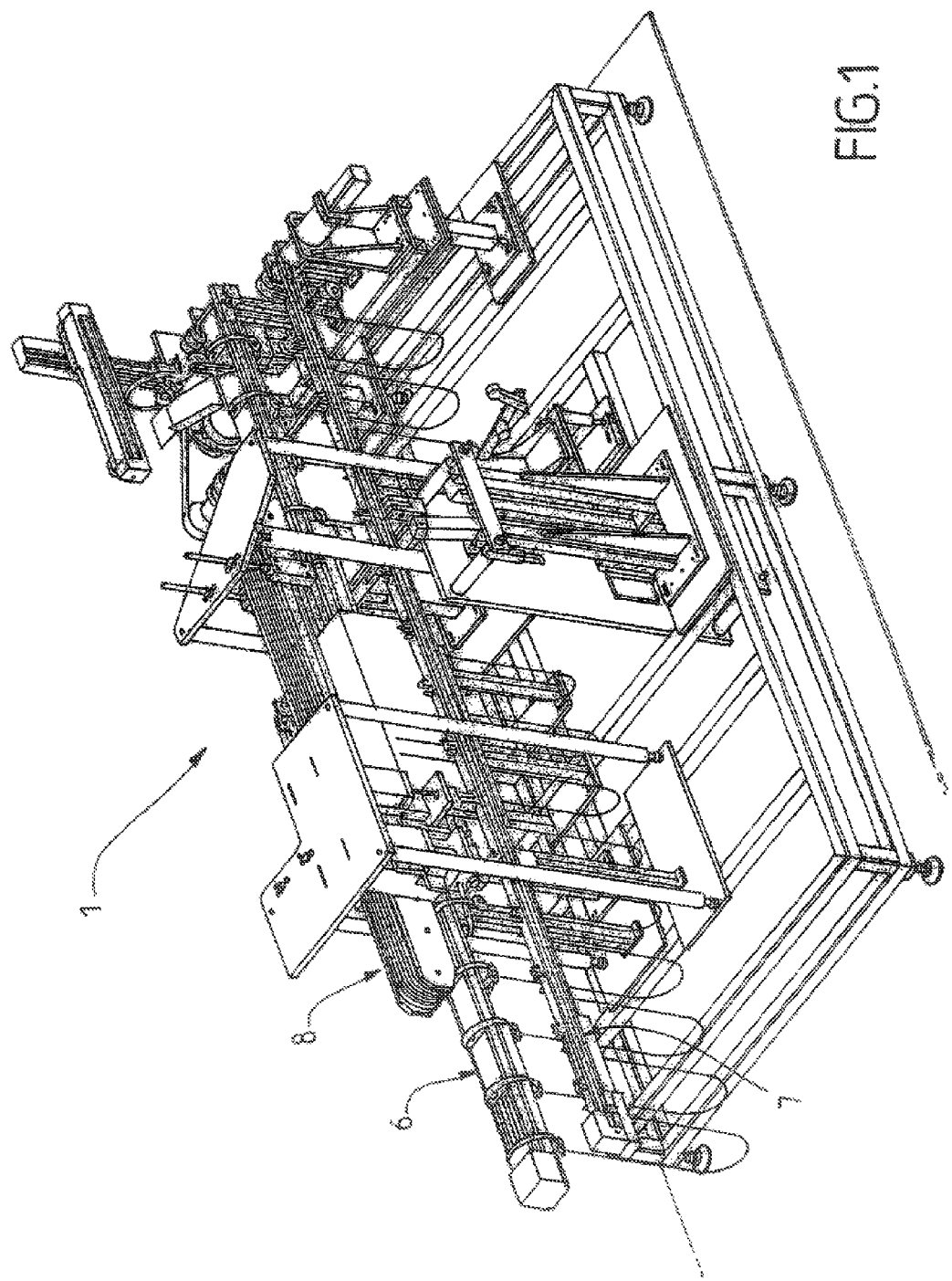

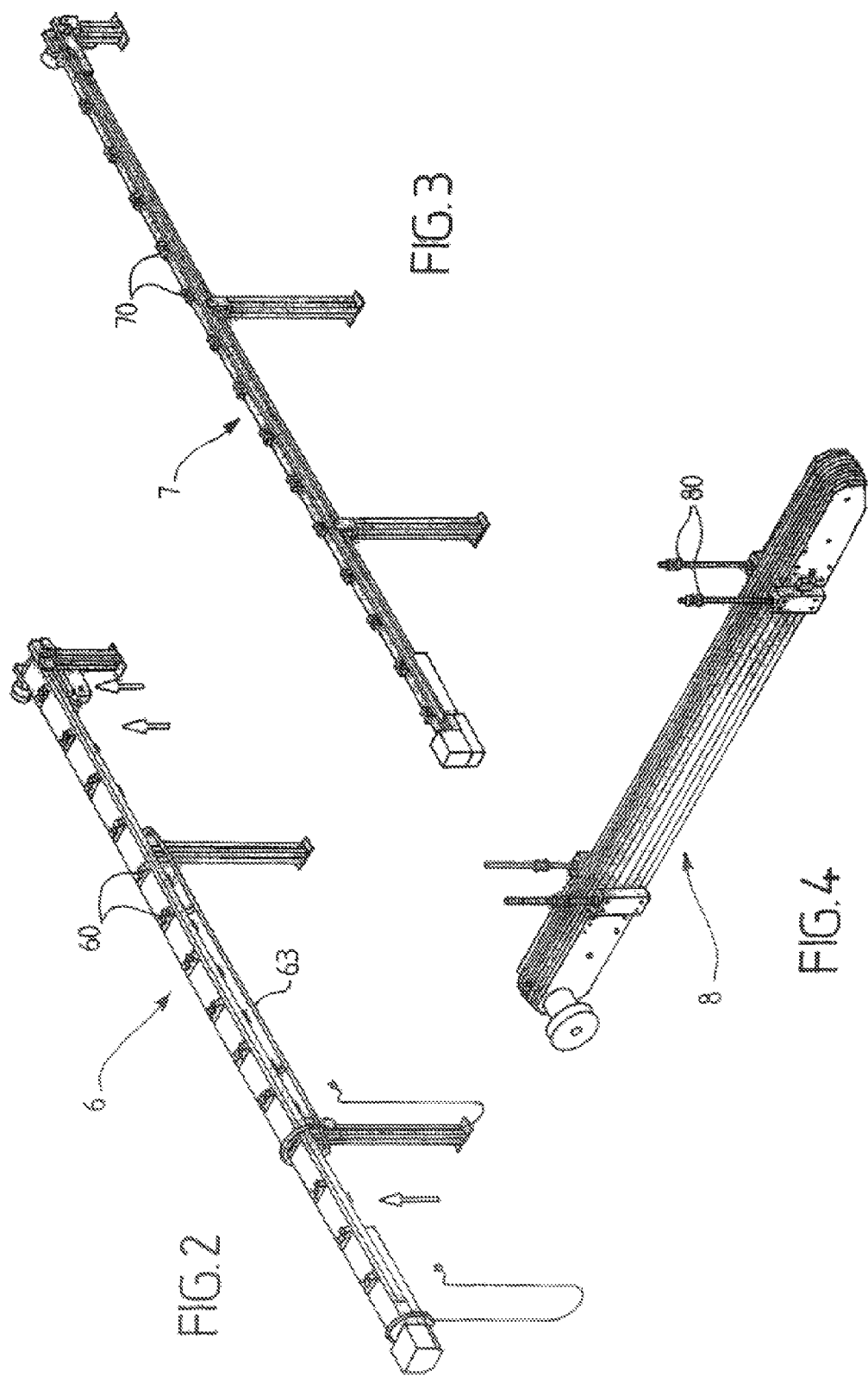

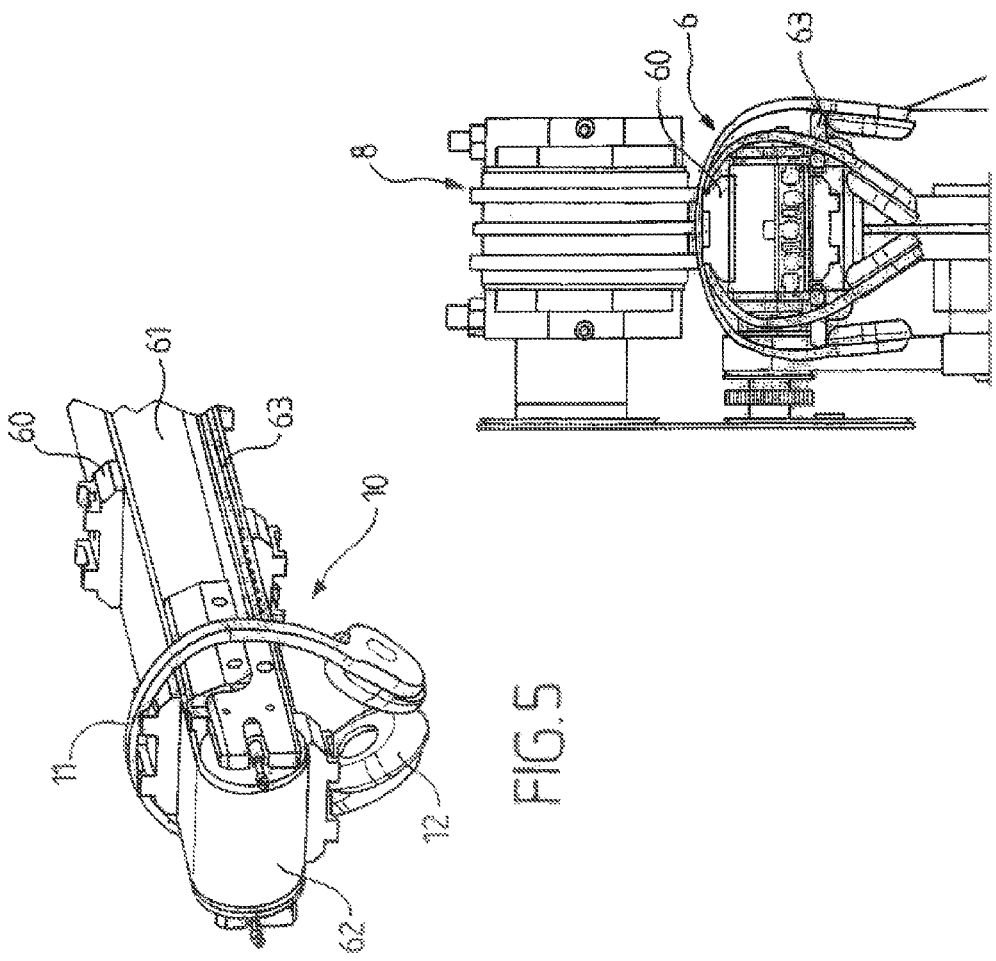

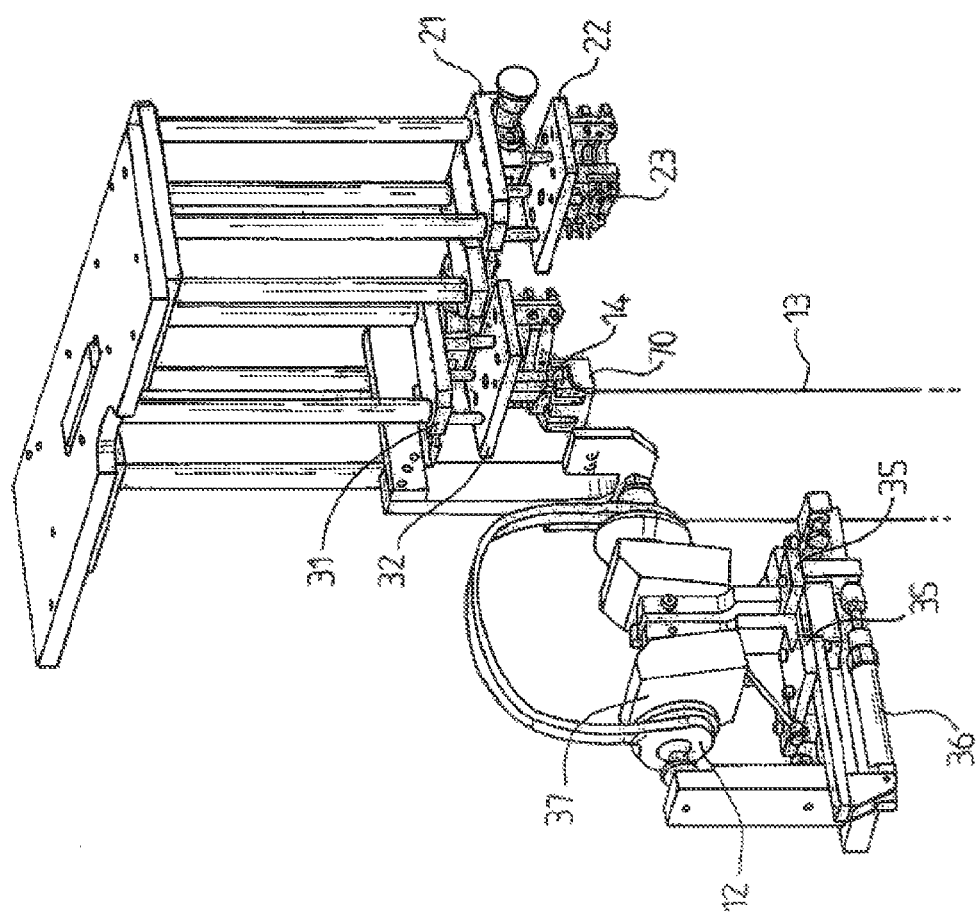

DEVICE FOR CONTROLLING AND CLEANING WIRED AUDIO HEADSETS

This invention relates to a device for controlling and cleaning wired audio headsets.

It relates more specifically, but not restrictively, to the wired audio headsets used in the field of air transport.

At the present time, since they cannot be recycled quickly and properly, the wired audio headsets used in air transport are, more often than not, crushed or sent to landfill after use. This solution is today in widespread use in respect of low-end audio headsets.

Alternatively, and particularly for well-made headsets, it is known for audio headsets to be recycled manually.

However, such operations are labour-intensive, thereby making the operation relatively expensive.

The drawback with this technique is the amount of time it takes to recycle the headsets manually.

The invention is therefore proposed in a context of cost-effectiveness and sustainable development, since the headsets, which no longer need to be crushed or sent to landfill, could be re-used after their reconditioning.

The aim of this invention is to overcome the various aforementioned drawbacks.

To be more precise, one aim of the invention is to provide a device for reconditioning audio headsets which is fast, reliable and efficient.

In at least one particular embodiment of the invention, one aim of the invention is to provide said technique, so that headset reconditioning can be simplified, and costs therefore reduced.

A further purpose of the invention is to propose such a device so that headsets for scrapping can be identified from headsets that are re-usable.

Another purpose of the invention is to be able to process a large number of headsets in a limited time.

These aims, as well as others which will become clear subsequently, are achieved according to the invention, using a device for controlling and cleaning wired audio headsets, each audio headset comprising a headband, two earphones and an electric cable connected to the earphones and ending in a plug, said device comprising:

impedance control means;
audio control means;
means for cleaning said headsets;
means for winding up the cable.

According to the invention, the headset impedance control, audio control, cleaning and cable winding means are placed at various successive stations, the device having conveying means capable of carrying the headsets to the various stations.

According to the invention, the conveying means comprise two conveyor belts parallel to one another, one, known as the first conveyor, being capable of receiving the headband/earphone assembly of the headset positioned astride said first conveyor and the other, known as the second conveyor, the plug of said headset, said two conveyor belts being synchronised and separated from one another so as to allow the cable to be freely suspended under the action of its weight between the two conveyor belts.

Preferably the device has a progressive edge comprising two guides, on either side of the first conveyor intended to engage with the headband in proximity to the earphones in order to open the headset, the device having means for restraining the headset on the first conveyor, placed above the first conveyor and intended to cooperate with the progressive edge when the headset is opened.

According to one variant, the headset restraining means comprise an upper edge intended to press on the headband of the headset.

According to another variant, the means for restraining the headset on the first conveyor comprise a third conveyor, known as the upper conveyor, placed above the first conveyor, synchronised with the first conveyor, in such a way that said upper conveyor crushes and restrains the headband of the headset when the headset is opened.

According to one advantageous embodiment allowing the conveyor stop phases to be reduced, the headset winding means comprise:

rotary fittings, mounted on said second conveyor, the upper part of each of the rotary fittings intended to receive the plug of the headset being free rotatably mounted relative to the belt of said second conveyor, one or, preferably, a plurality of motorized drive systems, positioned at fixed points above the second conveyor, intended to engage, during stop phases of the second conveyor, with each of the rotary fittings so as to cause them to rotate and thereby wind the cable on supports of the rotary fitting.

Alternatively the headset cable winding means may comprise a carriage mounted on vertical translation guiding means, the carriage being balanced by counterweights, a fork comprising fingers being rotatably mounted on said carriage, capable of being rotated on its axis by a motor in order to wind up the cable.

Preferentially, the impedance control means comprise electrical connection means capable of cooperating with the headset plug so as to pass an electric current through the cable of said headset and impedance measurement means.

According to one advantageous feature of the invention, the audio control means comprise means of electrical connection to the headset plug, and means capable of sending a signal having a set frequency as well as two mikes capable of picking up the sound emitted by the earphones of said headset.

According to one embodiment, the cleaning means comprise blasting means.

According to one particularly straightforward approach, the cleaning means comprise brushing means.

To advantage, according to one embodiment, the cleaning means comprise means for applying a disinfectant solution such as a hydro-alcoholic solution.

According to one advantageous feature of the invention, the disinfectant solution application means may be capable of impregnating the brushing means with said disinfectant solution.

According to one embodiment, a tie fitting device is capable of placing a tie on the cable wound by said headset cable winding means.

According to one embodiment, the device has means, and in particular pneumatic or robotic means, for removing the headsets that have failed an impedance control test implemented by said impedance control means and/or an audio control test implemented by said audio control means, or for removing the headsets after the winding, twist withdrawal or cleaning operations, if these have not been properly carried out.

The invention also relates to a facility comprising one or more devices and wrapping means capable of packaging the headsets that have been controlled and cleaned by said device (s).

Preferentially, the device or facility is used in the field of air transport with a view to the re-use of audio headsets.

Other inventive characteristics and advantages will become clearer from reading the following description of one particular inventive embodiment, given solely by way of example and non-restrictively, and from the appended drawings, wherein:

FIG. 1 is a perspective view of a recycling device according to the invention;

FIGS. 2, 3 and 4 show the conveyors of the inventive device;

FIGS. 5, 6 and 7 are detailed views of the inventive conveyors;

FIG. 10 shows the audio control means;

Figure 14:
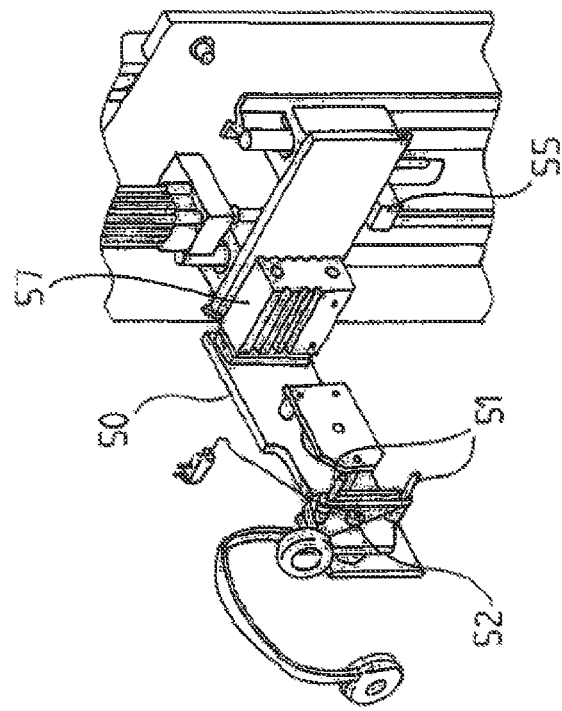
FIGS. 13 and 14 show the cable winding means.
Figure 13:
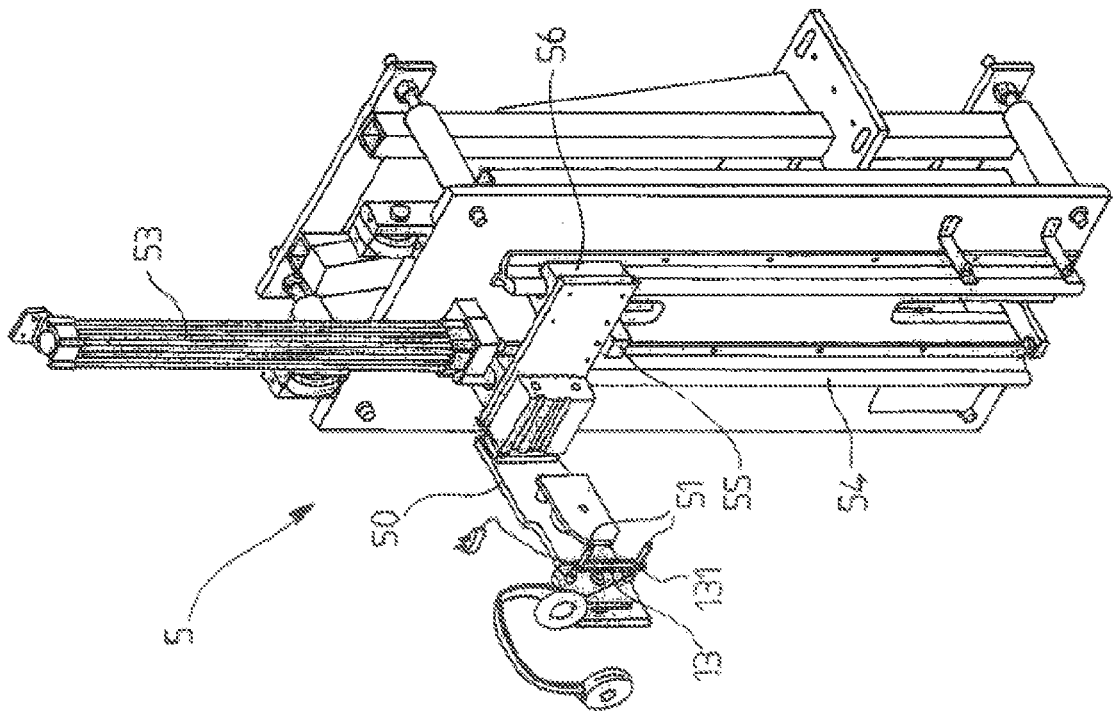
Figure 16:
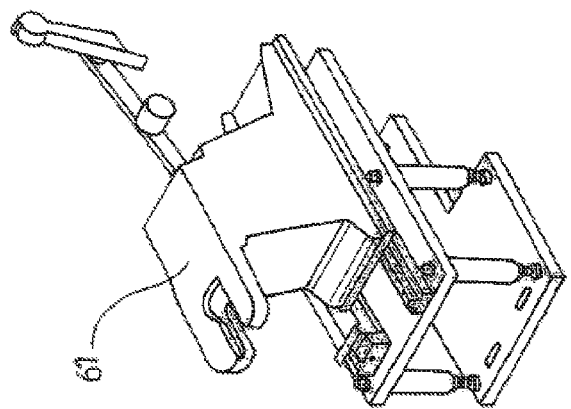
Figure 17:
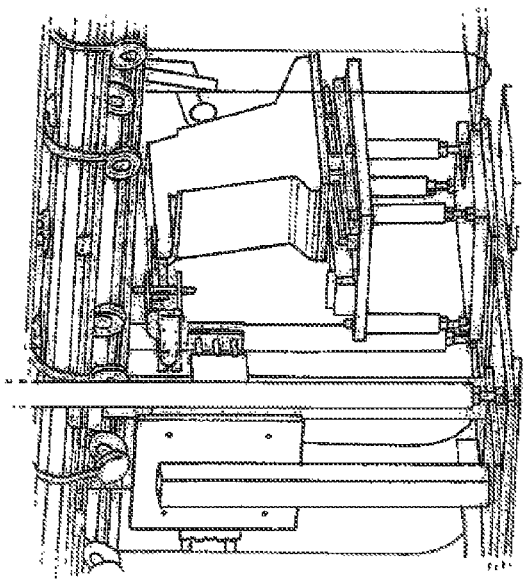
Figure 15:
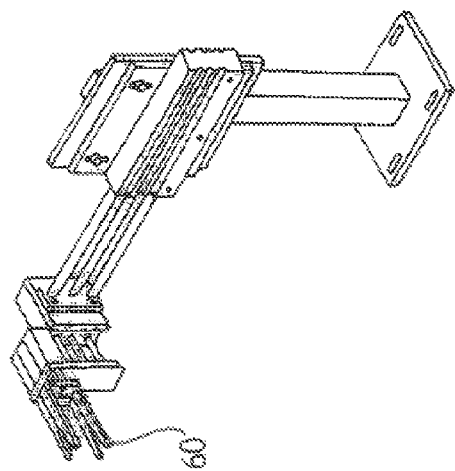
Figure 18:
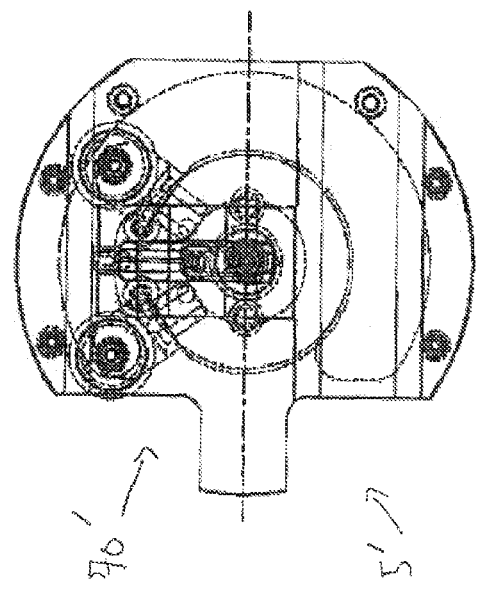
Figure 19:
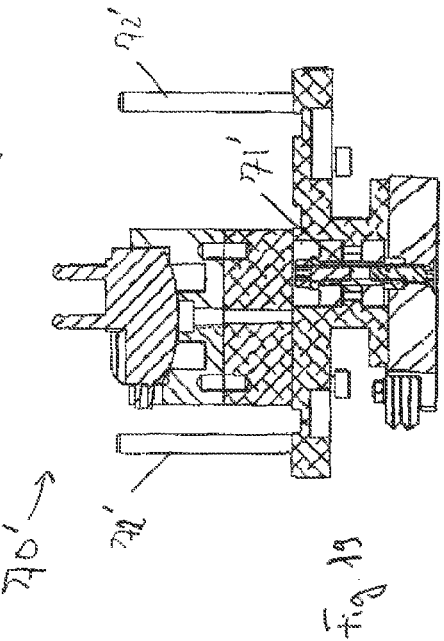
Figure 20:
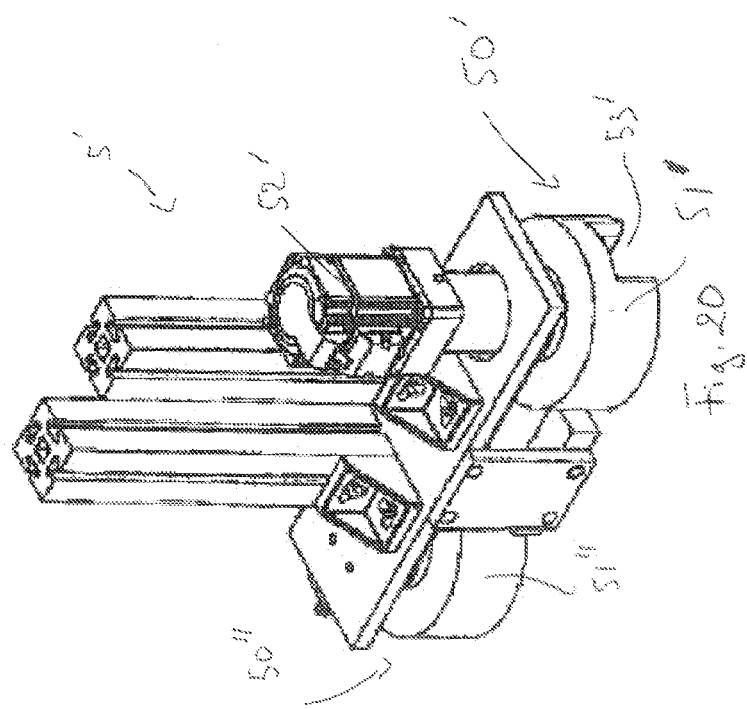
Figure 21:
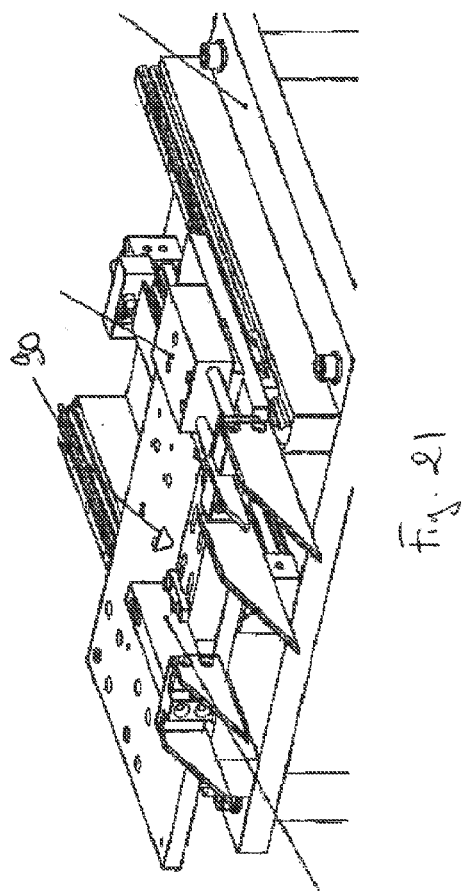
Figure 22:
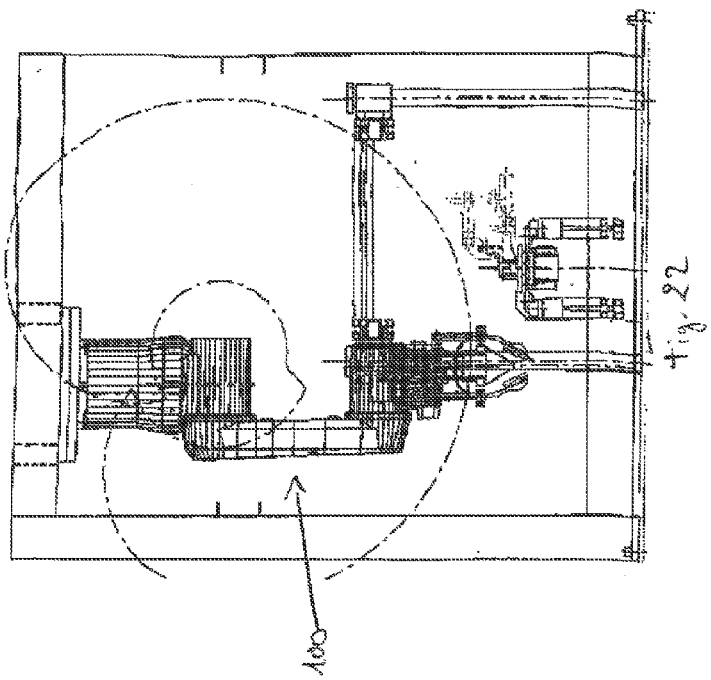

FIGS. 15, 16 and 17 also show the cable winding means;

FIGS. 18 to 20 show an advantageous alternative to the winding means shown in FIGS. 13 and 14, comprising rotary fittings, mounted on the second conveyor, and motorised drive means, placed at fixed points, for rotating the rotary fittings, FIG. 21 shows the stripper system for removing the stranded cable wound on the rotary fitting in FIGS. 18 and 19, FIG. 22 shows a robot provided to grasp the headset and the stranded cable in order to put them together.

As previously mentioned, the general principle of the invention therefore lies in the implementation of a device for the reconditioning of wired audio headsets.

The device, shown in FIG. 1, comprises impedance control means, audio control means, headset cleaning means and means for winding up the cable of the audio headset.

As may be seen in FIG. 1, the device also comprises three conveyors 6, 7 and 8. The first conveyor 6, known as the headset conveyor and shown in FIG. 2, is formed of a support structure 61 fitted with a belt guide and a belt 62. This conveyor 6 is intended to receive the headband 11 of the headsets 10 by means of shaped supports 60 secured to the belt 62, distributed on the belt 62 at regular intervals. Each headset 10 is thus positioned astride the first conveyor 6, supported by means of the headband 11 on the corresponding shaped support 60, the earphones 12 being positioned on either side of the conveyor 6.

The second conveyor 7, known as the connector conveyor, is also formed of a support structure 71 provided with a belt guide and a belt 72. This conveyor 7 is intended to receive the plugs 14 of the headset 10 by means of connector holders 70 placed all along the conveyor 7.

Preferentially the connector holders 70 are secured to the belt 72 of the second conveyor 7 and are distributed at regular intervals, positioned opposite the shaped supports 60 of the first conveyor 6. The second conveyor 7 is placed parallel to the first conveyor 6, the conveyors 6, 7 being separated from one another so as to let the cable 13 hang freely under the action of its weight between the two conveyors 6 and 7. A sufficient clearance between and under the two conveyors 6 and 7 is provided for this purpose.

A third conveyor 8, known as the upper conveyor, is placed above, and set back from, the first conveyor 6, so as to crush and restrain the headband 11 of the headset 10 and thereby separate the earphones 12 of the headset 10 during the progress of the headset, in cooperation with a progressive edge 63.

According to one embodiment not shown, the third conveyor 8 may be replaced by an upper edge intended to restrain the headset on the first conveyor. Opening the headset makes it easier to position the earphones opposite earphones 37 of the audio control means 3. As shown in FIG. 7, the height of this third conveyor 8 (or of the upper edge) may be adjusted by means of adjustment means 80 (i.e. screw/nut system) so as to adjust the pressure exerted on the headband 11 of the headsets 10.

The progressive edge 63 is placed on each side of the first conveyor 6 so as to keep the headset 10 "open". A motor, not shown, is charged with transmitting the rotary motion to the three conveyors, or even to the two conveyors, by means of suitable transmissions (i.e. belt and pulley transmission).

To advantage, a single motor activates the three conveyors (or the two conveyors in the case of the upper edge) in such a way that they are synchronised with each other.

According to another alternative, each conveyor may have its own motor, the conveyors 6, 7 then being synchronised electronically.

Figure 9:
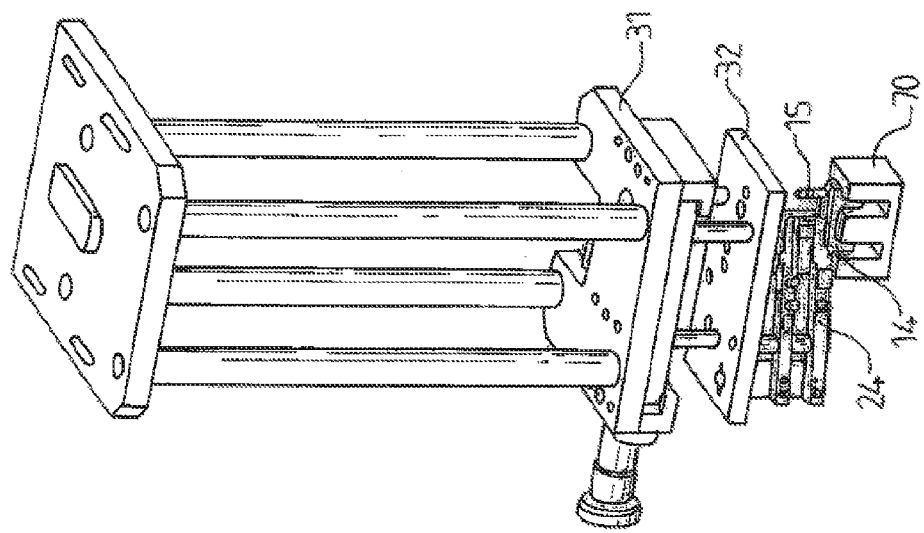
FIGS. 8 and 9 show the impedance control means.
Figure 8:
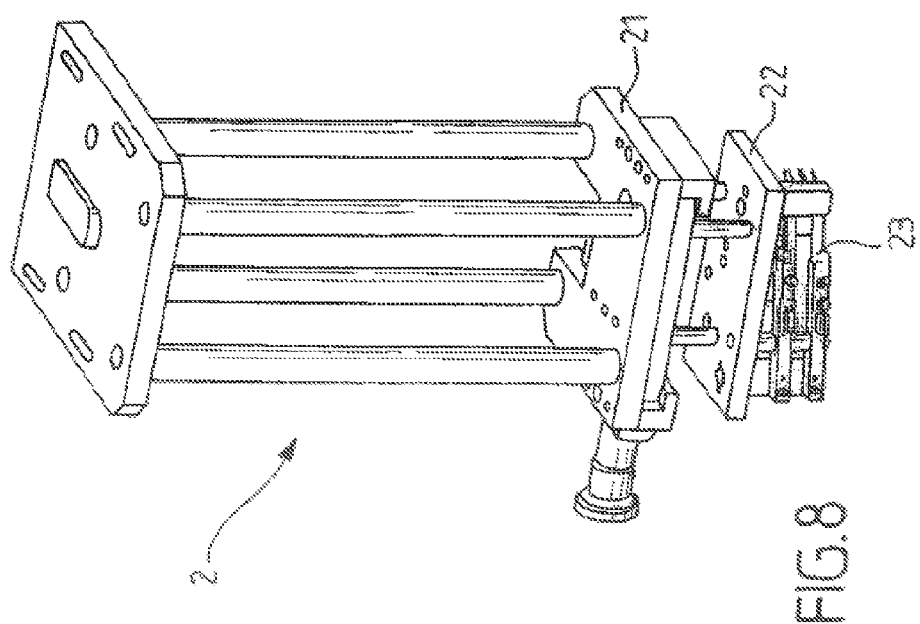

The impedance control means 2, shown in FIGS. 8 and 9, comprise a plug-in unit 21 for installing a control head 22 comprising electrical connection means, and in particular conductive pads 23 mounted on a spring system capable of coming into contact with the contacts placed on the "jack" pins 15. Once the control head 22 and the connector 14 are connected, an electric current is sent through the cable 13 to check the integrity thereof.

The plug-in unit 21 makes it possible to advantage for the control head 21 to be quickly disassembled and thus for the control head to be adapted as a function of the headset plug 14.

The sound control means 3, shown in FIG. 10, comprise a system for controlling the plug 14, identical to that of the impedance control means.

The control means 3 comprise a plug-in unit 31 for installing a control head 32 that can be quickly disassembled and comprising electrical connection means, and in particular conductive pads 24 mounted on a spring system capable of coming into contact with the contacts placed on the "jack" pins 15. These sound control means 3 also comprise a double carriage system 35 mounted on a guide, and in particular one with prismatic ball bearings, and activated by pneumatic jack 36 intended to bring the earphones 12 of the headset 10 into contact with the two mikes 37 mounted on the two carriages respectively. With the headset positioned at the level of the means 3, the jack 36 is activated, separating the two mikes 37 one from another, until they are brought into contact with the earphones 12. Once the control head 32 and the plug 14 are connected, a signal having a set frequency is sent through the cable 13 to check that the earphones 12 are operating properly. The mikes 37 allow the sound emitted by the earphones 12 of the headset 1 to be picked up. A sound analyser is used to check that the sound picked up matches the triggering signal and to be more specific that the sound emitted is at the set frequency.

According to one specific embodiment of the invention, the mike supports 37 may be swivel-mounted so as to tailor the support on the earphones 12.

To advantage, the conductive pads 22 and 23 are two or three in number depending on the type of "jack" pin present, the mono "jack" pins comprising two contacts and the stereo "jack" pins three contacts. Preferentially, the conductive pads are made of copper, although any other electrically conductive material may be appropriate.

Figure 11:
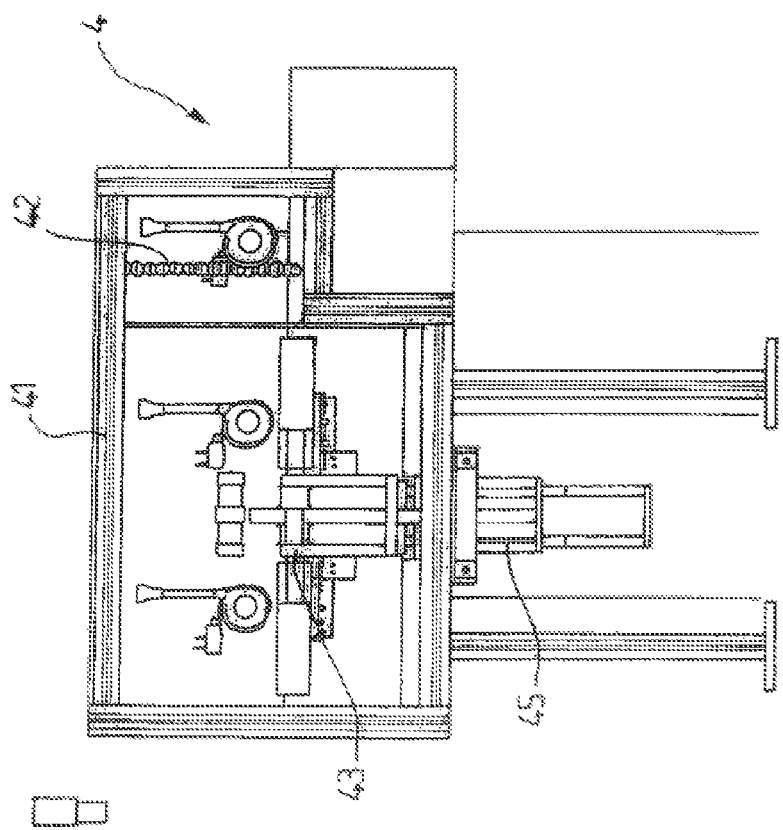

The headset cleaning means 4, shown in FIG. 11, comprise two stations, a first station provided with blasting means 42 and a second station provided with brushing means 43. The cleaning means 4 are constituted by a housing 41 divided into two in order to separate the blasting means from the brushing means.

The blasting station is thus provided with blasting means 42 such as nozzles intended to discharge compressed air onto the headsets 10. To advantage, dust recovery means may be provided in order to prevent said dust from being deposited anew on the headset 10.

According to one specific inventive embodiment, the compressed air discharge nozzles may be adjustable.

Figure 12:
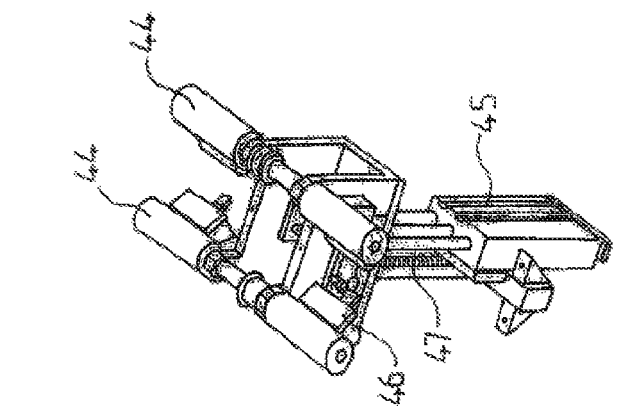
FIGS. 11 and 12 show the cleaning means.

The brushing station, shown in detail in FIG. 12, comprises rollers 44 arranged horizontally and mounted on translation means 45 moving, vertically and/or horizontally, such as a pneumatic up and down system cooperating with a rack 47 and a gearing system intended to rotate the rollers 44 during the translational motion. The brushing station also comprises means 46 for applying a disinfectant solution such as nozzles arranged in an affixed manner relative to the rollers, a small bottle being provided at the upper part of the structure and supplying the application means 46 with the disinfectant solution by gravity. To advantage, an electrically controlled valve is installed on the disinfectant solution supply circuit, not shown, so that the supply to the nozzles can be stopped.

According to one specific inventive embodiment, the gearing system may be installed so as to rotate the rollers on the right-hand side in the opposite direction from the rollers on the left-hand side.

According to one inventive embodiment, an electric motor may be placed in the brushing station so as to rotate the rollers continuously.

The winding means 5, shown in FIGS. 13 and 14, comprise a carriage 50 mounted on vertical translation guiding means, such as linear bearings 56 sliding on rails 54, and balanced by counterweights. On the carriage 50 are mounted fingers 51 on a rotation axis 52 and activated by a motor, thereby forming a fork capable of winding the cable 13 during the rotation of the fingers 51.

A stop 55, placed in the lower part, is used to stop the carriage 50 at the lower position to await the next headset. Said stop 55 is brought down when the headset 10 is in position, so that the carriage 50 stretches the cable downward, initially. Successively, the fork is rotated on its axis in order to wind the cable 13.

Rotating the fork pulls the cable 13 thereby forcing the carriage 50 upwards. Said counterweight system allows the tension on the cable 13 of the headset 10 to be limited during this operation. At the end of the operation, the cable 13 is wound in the form of a strand 131, as shown in FIG. 13.

Pneumatic handling means, shown in FIG. 15, such as a pneumatic clamp 60, are used to make the link between the winding station and the placing of a tie by means of a tie fitting device 61, also known as a tie twister ("twisteuse"), shown in FIG. 16, to keep the strand 131 in place.

A lever is used to calibrate the carriage 50 always at one and the same height, so that the clamp 60 is able to take the strand 131 at the same level, a jack 57 being used to strip the cable wound on the fingers 51 when the transfer clamp 60 has taken the strand.

Unloading means are also provided depending on whether or not the headset 10 is operational. Thus, if the headset 10 is deemed to be non-operational, handling means, and in particular pneumatic or automated ones, such as a clamp or any other means capable of grasping the headset, catch hold of the headset and unload it into a discharging channel, a jack being charged with unclipping the connector from its support. A headset 1 is in particular deemed to be non-operational when it fails the impedance test and/or the audio control test mentioned earlier and/or is non-twisted. Non-operational headsets will not be recycled and may be scrapped.

In the event of the headset 10 being deemed to be operational, grip means such as a clamp may possibly take the headset 10 and then drop the headset 10 onto a stop so as to swivel the earphones on the inside and to lay the headset 10 flat on a conditioning conveyor.

A headset 1 is deemed to be operational when it successfully gets through the impedance control test and the audio control test mentioned earlier. Operational headsets will to advantage be recycled.

The device for recycling audio headsets according to the invention operates continuously and as follows.

The operator initially lays the headband 11 and the plug 14 on the respective support 60, 70 placed on each conveyor 6, 7 and ensures that the retractable pin 15 of the connector is properly in the control position, the headset and the connector then moving in a synchronised manner.

The headset initially encounters the upper conveyor 8 which will exert a pressure on the headband so as to restrain and open the headset. This opening of the headset is completed and supported by means of the progressive edge 63. This edge 63 comprises two guides, on either side of the first conveyor 6, which engage respectively with the headband in proximity to the earphones 12.

The headset 10 and the connector 14 mark a first stop at the level of the impedance control station. The control head 22 provided with conductive pads 23 makes the contact with the "jack" pins in order to simulate a connection and to pass an electric current through the cable. The conductive pads 23 come into contact with the "jack" pins 25 when the conveyor advances by one step in order to position the headset at the level of the control station, the "jack" pins 25 then pushing the conductive pads 23 back and the spring system keeping them in contact. An electronic means measures the impedance of the headset and compares the measured impedance with the nominal impedance of the headset. Where the measured impedance satisfies an impedance tolerance range, the control is deemed to be satisfactory. Otherwise the audio headset is deemed to be non-operational.

In the event of the impedance control proving positive, the headset 10 and the connector 14 are moved up to the next station, namely the audio control station. The same operation as at the previous station is performed in order to connect the plug 14 to the conductive pads 24. Moreover, the earphones 12 are positioned against mikes 37. Once the connection is made, a signal having a set frequency is sent through the cable 13.

If the mikes 37 placed against the earphones 12 receive a signal analysed as satisfactory, the headset 10 is deemed to be operational. In the contrary event, the headset 10 is deemed to be scrap.

After the audio control, the headset is carried to the cleaning station. The headset passes into a first compartment between nozzles discharging compressed air so as to rid it of dust, a suction inlet being provided to recover the dust.

The headset then passes into the second compartment provided with rollers to brush the inside of the earphones and apply a hydro-alcoholic solution. The rollers are evenly impregnated with a hydro-alcoholic solution by means of fixed nozzles placed in proximity to the rollers. The rollers 44 are moved upwards against the earphones 12 in order to clean them.

The headset is then carried to the winding station. The fork of the winding means 5 grasps the still hanging cable and pulls it downwards. Successively the fork is rotated on its axis to wind up the cable 13.

The rotation of the fork pulls on the cable 13 thereby forcing the carriage 50 of the means 5 upwards until the strand 131 is formed.

The pneumatic clamp 60 then grasps the strand 131 and successively the jack 57 is activated in order to strip the strand 131 from the fork of the winding means 5.

The pneumatic clamp 60 then transfers the strand 131 to the tie fitting device 61, namely the tie twister 61. This tie twister fits a tie around the strand 131 in order to hold it in place. The pneumatic clamp 60 may then release the strand 131.

Clearly, the headsets that fail the impedance test and/or the audio test will be removed by any appropriate means, such as pneumatic means.

According to the previously described embodiment, the winding means shown in FIGS. 13 and 14 carry out the whole winding operation in a fixed position, during a single stop phase of the second conveyor 7.

As a function of cable length, the inventors have noted that this winding stage was more often the longest step, and therefore, slowed up the work rate of the whole device by imposing stop times that were too long between each forward phase of the conveyors 6, 7 and/or 8.

The inventors have overcome this problem by replacing the winding means in FIGS. 13 and 14 by those shown in FIGS. 18 to 20.

To this end, the connector holders 70, rigidly secured to the sheet of the second conveyor 7 are replaced by rotary fittings 70' shown in FIGS. 18 and 19.

The upper part of each fitting 70' is used to receive the plug of the headset and is mounted freely in rotation around a vertical axis 71', particularly by means of ball bearings.

The upper part of each fitting is thereby mounted with the sheet of the conveyor 7, but is free in rotation around the axis 71'.

One or, preferably, a plurality of motorised drive system(s) 50', 50", positioned in fixed positions above the second conveyor 7 are then intended to engage, during stop phases of the second conveyor 7, with each of the rotary fittings in order to cause them to rotate, and thereby wind the cable on supports 72' of the rotary fitting 70'.

When aligned with the rotary fitting 70', the motorised drive system 50' may comprise a bowl 51' intended to engage with the upper part of the rotary fitting 70'. To be more specific, when the conveyor 7 advances the rotary fitting 70 is guided in a drive notch 53' of the bowl 51'.

When the conveyor 7 stops, the bowl 51', then engaged with the fitting 70', is rotated by the motor 52' and causes the fitting 70' to rotate, thereby winding the cable on supports (i.e. rods 72') of the upper part of the fitting 70'.

To advantage by providing a plurality of (and in particular two) motorised drive systems 50', 50" placed in as many fixed positions, the cable may be fully wound on a plurality of stop phases of the conveyor 7, and not only on one single stop phase.

The cable may be tensed by a jack exerting a controlled pressure between the first conveyor 6 and the second conveyor 7, thereby guaranteeing a minimum tension on the rods 72' of the rotary fitting.

Adjusted cams may be placed in the axis of the second conveyor 7, along the latter, in order to inhibit the rotation of the rotary fittings when they are not engaged with the drive system or systems 50', 50".

The operation, once completed, gives a stranded cable whereof the tension and the positioning on the fitting 70' are controlled.

Means 90, and in particular pneumatic ones, shown in FIG. 21, make it possible to strip the stranded cable from said rotary fittings 70'. These stripping operations are controlled by means of a pneumatic jack, with reference to a given axis of the fitting, so as not to damage the strand or the plug. The purpose of these operations is to finalise the preparation and bringing together of the strand with the headband of the headset.

Unloading means are also provided for the purpose of reuniting the strand and the headband of the headset. The strand may be unloaded by one or more actuators, and in particular pneumatic ones, fitted with clamp(s) in order to bring the strand and plug assembly to a certain height. The headband may be unloaded from the first conveyor 6 by a robot 100, and in particular a six axis one, shown in FIG. 22 fitted with a pneumatic clamp and a system for referencing the headset.

The pneumatic actuators and the robot work in concert to bring together the strand/plug and headband assembly. Once the strand/plug and the headband are brought together, the robot clamp grasps said assembly. A tie (twist) is then applied to the assembly by a tie fitting device.

The invention also relates to a facility including one or more device(s) in accordance with the invention and wrapping means capable of packaging the headsets that have been controlled and cleaned by said device(s).

The wrapping means may be constituted by a single film wrapping device which will be supplied by one or more devices 1 in accordance with the invention, arranged in parallel.

The invention claimed is:

1. A device for controlling and cleaning wired audio headsets, each audio headset comprising a headband, two earphones and an electric cable connected to the earphones and ending in a plug, wherein said device includes:
   impedance control means (2);
   audio control means (3;
   means (4) for cleaning said headsets;
   means (5; 5') for winding up the headset cable; and
   wherein the impedance control means, audio control means, cleaning means and cable winding means are placed at various successive stations, said device having conveying means for carrying the headsets to the various stations, comprising two conveyor belts parallel with each other, one, known as the first conveyor (6), being for receiving the headband/earphone assembly of the headset positioned astride said first conveyor and the other, known as the second conveyor (7), for receiving the plug of said headset, said two conveyor belts (6, 7) being synchronized and separated from one another so as to allow the cable to be freely suspended under the action of its weight between the two conveyor belts (6, 7).

2. The device as claimed in claim 1, having a progressive edge (63) comprising two guides, on either side of the first conveyor (6) intended to engage with the headband in proximity to the earphones (12) in order to open the headset, the device having means for restraining the headset on the first conveyor (6) placed above the first conveyor (6) and intended to cooperate with the progressive edge (63) when the headset is opened.

3. The device as claimed in claim 2 wherein the headset restraining means comprise an upper edge intended to press on the headband of the headset.

4. The device as claimed in claim 2 wherein the means for restraining the headset on the first conveyor comprise a third conveyor (8), known as the upper conveyor, placed above the first conveyor (6), synchronised with the first conveyor, in such a way that said upper conveyor crushes and restrains the headband of the headset when the headset is opened.

5. The device as claimed in claim 1, wherein the winding means (5') comprise:
- rotary fittings (70'), mounted on said second conveyor (7), the upper part of each of the rotary fittings intended to receive the plug of the headset being mounted freely in rotation relative to the belt of said second conveyor (7),
- one or a plurality of motorized drive systems (50', 50"), positioned at fixed points above the second conveyor (7), intended to engage, during stop phases of the second conveyor (7), with each of the rotary fittings so as to cause them to rotate and thereby wind the cable on supports (72') of the rotary fitting (70').

6. The device as claimed in claim 1, wherein the impedance control means include electrical connection means for cooperating with the headset plug so as to pass an electric current through the cable of said headset and impedance measurement means.

7. The device as claimed in claim 1 wherein the audio control means comprise means for electrical connection to the headset plug, and means for sending a signal having a set frequency as well as two mikes capable of picking up the sound emitted by the earphones of said headset.

8. The device as claimed in claim 1, wherein the cleaning means comprise blasting means.

9. The device as claimed in claim 1, wherein the cleaning means comprise brushing means.

10. The device as claimed in claim 9, wherein the cleaning means comprise means for applying a disinfectant solution such as a hydro-alcoholic solution.

11. The device as claimed in claim 10, wherein the disinfectant solution application means are for impregnating the brushing means with said disinfectant solution.

12. The device as claimed in claim 1, wherein the means (5) of winding up the headset cable comprise a carriage (50) mounted on vertical translation guiding means, the carriage (50) being balanced by counterweights, a fork comprising fingers (51) being rotatably mounted on said carriage (50), for being rotated on its axis by a motor in order to wind up the cable (13).

13. The device as claimed in claim 1, having a tie fitting device (61) for placing a tie on the cable wound by said headset cable winding means.

14. The device as claimed in claim 1 having means, and in particular, pneumatic or robotic means, for removing the headsets that have failed an impedance control test implemented by said impedance control means and/or an audio control test implemented by said audio control means, or for removing the headsets after the winding, twist removal or cleaning operations if these have not been properly carried out.

15. A facility including one or more device(s) as claimed in claim 1 and wrapping means for packaging the headsets that have been controlled and cleaned by said device(s).

16. The device as claimed in claim 1, wherein the cleaning means comprise means for applying a disinfectant solution.

* * * * *